United States Patent [19]
Bestgen et al.

[11] Patent Number: 6,134,546
[45] Date of Patent: Oct. 17, 2000

[54] METHOD AND COMPUTER PROGRAM PRODUCT FOR IMPLEMENTING SUBQUERY JOIN

[75] Inventors: Robert Joseph Bestgen, Dodge Center; Randy Lynn Egan; Carol Ledermann Ramler, both of Rochester, all of Minn.

[73] Assignee: International Business Machines Corporation, Armonk, N.Y.

[21] Appl. No.: 09/104,611

[22] Filed: Jun. 25, 1998

[51] Int. Cl.[7] .................................................... G06F 17/00
[52] U.S. Cl. ..................... 707/4; 707/3; 707/5; 707/101
[58] Field of Search ................... 707/3, 4, 5, 6, 707/102, 203, 101, 201, 7, 8, 202, 9; 709/105

[56] References Cited

U.S. PATENT DOCUMENTS

| | | | |
|---|---|---|---|
| 6,035,307 | 5/2000 | Martin et al. | 707/203 |
| 6,044,366 | 3/2000 | Graffe et al. | 707/2 |
| 6,055,528 | 4/2000 | Evans | 707/3 |
| 6,061,676 | 5/2000 | Srivastava et al. | 707/3 |

OTHER PUBLICATIONS

Almeroth, "A long–term analysis of growth and usage patterns in the Multicast Backbone (MBone)". INFOCOMM 2000, IEEE Computer and Communication Societies, Proceedings, Mar. 26–30, 2000, pp. 824–833, vol. 2.

Huang et al., "A query mediation approach to interoperability of heterogeneous databases", Database Conference, 2000, ADC 2000, Australasian Proceeding, Jan. 31–Feb. 3, 2000, pp. 41–48.

Sitzmann et al., "O–trees: a constraint–based index structure", Database Conference, 2000, ADC 2000, Australasian Proceeding, Jan. 31–Feb. 3, 2000, pp. 127–134.

Anderson, Mark A. and Richard L. Cole, "An Integrated Data Base", in IBM Application System 400 Technology, 1988, pp20–25.

Martin, Patrick T., et al., "Parallel Hash–Based Join Algorithms for a Shared Everything Environment", IEEE Transactions on Knowledge and Data Engineering, vol. 6, No. 5, Oct. 1994.

*Primary Examiner*—Thomas G. Black
*Assistant Examiner*—David Jung
*Attorney, Agent, or Firm*—Joan Pennington

[57] ABSTRACT

A method and computer program product are provided for processing subquery join composites using hash join in a computer system. A hash table is built for a first table to be joined with a second table. A cursor is built for the second table. For each tuple in the second table, the hash table for the first table is probed. If a match is found, then any non-equal join predicate is evaluated. A unique fanout join is processed to return an error if a tuple or row from the second table joins to more than one row in the first table where the result of the basic predicate subquery can only be one row. A distinct fanout join is processed when the tuple or row from the second table joins to a row in the first table, the row is returned, advancing to a next tuple in the second table without checking for any more matches on the first table.

12 Claims, 20 Drawing Sheets

| TABLE NAME | ROWS | STORAGE USE |
|---|---|---|
| CUSTOMER | 150000 | 34.6M |
| NATION | 25 | 20.4K |
| ORDERS | 1500000 | 203.4M |
| PART | 200000 | 33.6M |
| PART SUPPLIER | 800000 | 176.2M |
| REGION | 5 | 12.3K |
| SUPPLIER | 10000 | 2.2M |

FIG. 9A

| CLOCK TIME (IN SEC.) | HASH JOIN NO SMP | | HASH JOIN SMP | | NESTED LOOP NO SMP | | NESTED LOOP SMP | |
|---|---|---|---|---|---|---|---|---|
| | WALL | CPU | WALL | CPU | WALL | CPU | WALL | CPU |
| Q1 | 41.4 | 41.1 | 12.6 | 33.0 | 11.3 | 11.1 | 11.9 | 11.8 |
| Q2 | 56.6 | 53.2 | 27.8 | 46.2 | 18.0 | 17.9 | 17.1 | 17.0 |
| Q3 | 21.3 | 21.1 | 9.1 | 19.0 | 40.3 | 40.2 | 26.8 | 56.7 |
| Q4 | 34.7 | 31.6 | 28.9 | 32.8 | 89.4 | 87.6 | 76.2 | 104.5 |

FIG. 9B

| TABLE NAME | ROWS | STORAGE USE |
|---|---|---|
| SYS COLUMNS | 81143 | 130.3M |
| SYS TABLES | 3777 | 6.6M |
| SYS INDEXES | 107 | N/A |

FIG. 10

| CLOCK TIME (IN SEC.) | HASH JOIN NO SMP | | HASH JOIN SMP | | NESTED LOOP NO SMP | | NESTED LOOP SMP | |
|---|---|---|---|---|---|---|---|---|
| | WALL | CPU | WALL | CPU | WALL | CPU | WALL | CPU |
| Q5 | 24.9 | 24.5 | 24.7 | 24.4 | 31.1 | 31.0 | 31.6 | 31.4 |
| Q6 | 21.5 | 21.1 | 20.2 | 21.9 | 12.7 | 12.6 | 12.7 | 12.5 |
| Q7 | 8.1 | 7.6 | 7.5 | 9.0 | 19.9 | 9.8 | 10.0 | 9.9 |

FIG. 11

| T1, C1 | T1, C2 |
|--------|--------|
| 1 | A |
| 2 | B |
| 3 | C |

FIG. 12A

| T2, C3 |
|--------|
| A |
| A |
| C |

FIG. 12B

METHOD AND COMPUTER PROGRAM PRODUCT FOR IMPLEMENTING SUBQUERY JOIN

FIELD OF THE INVENTION

The present invention relates to the data processing field, and more particularly, relates to a method and computer program product for processing subquery join composites using hash join in a computer system.

DESCRIPTION OF THE RELATED ART

Relational database management systems (RDBMS) based on the Structured Query Language (SQL) are known. The basic unit of data in a relational database is the relation. An SQL query based interface allows a user to formulate relational operations on the database tables. The join operation is one of the most frequently used and most expensive operations in a relational database.

There is a certain class of SQL queries containing subqueries that can be implemented as join composites. These join composites use special join rules referred to (in DB2/400 terminology) as distinct and unique joins. Currently these join composites are implemented using nested loop join which does not always perform optimally.

DB2/400 is the DBMS that is integrated into the operating system of the International Business Machines Corp. Application System/400 (AS/400) computer system. The currently available release of DB2/400, V4R2, supports subquery join composites. Subquery join composites can be generated for a class of subqueries which can be implemented by transforming the subquery into special types of join. Currently these special joins are implemented using variations on the standard nested loop join method. The DB2/400 nested loop join implementation requires use of a B+radix tree index. DB2/400 also supports hash join but this join method is only used for inner joins. DB2/400 hash join does not support distinct and unique joins. Under certain conditions such as long running queries, hash join often performs better than nested loop join. Hash join usually performs better for longer running queries especially where no suitable index is available.

A need exists for an improved method and computer program product for processing subquery join composites using hash join in a computer system.

SUMMARY OF THE INVENTION

A principal object of the present invention is to provide an improved method and computer program product for processing subquery join composites using hash join in a computer system. Other important objects of the present invention are to provide such method and computer program product processing subquery join composites using hash join substantially without negative effects and that overcome many disadvantages of prior art arrangements.

In brief, a method and computer program product are provided for processing subquery join composites using hash join in a computer system. A hash table is built for a first table to be joined with a second table. A cursor is built for the second table. For each tuple in the second table, the hash table for the first table is probed. If a match is found, then any non-equal join predicate is evaluated.

In accordance with features of the invention, a unique fanout join is processed to return an error if a tuple or row from the second table joins to more than one row in the first table where the result of the basic predicate subquery can only be one row. A distinct fanout join is processed when the tuple or row from the second table joins to a row in the first table, the row is returned, advancing to a next tuple in the second table without checking for any more matches on the first table.

BRIEF DESCRIPTION OF THE DRAWING

The present invention together with the above and other objects and advantages may best be understood from the following detailed description of the preferred embodiments of the invention illustrated in the drawings, wherein:

FIGS. 9A, 9B, 10, 11, 12A and 12B are tables illustrating performance examples of the preferred embodiment;

DETAILED DESCRIPTION OF THE PREFERRED EMBODIMENTS

Figure 1:
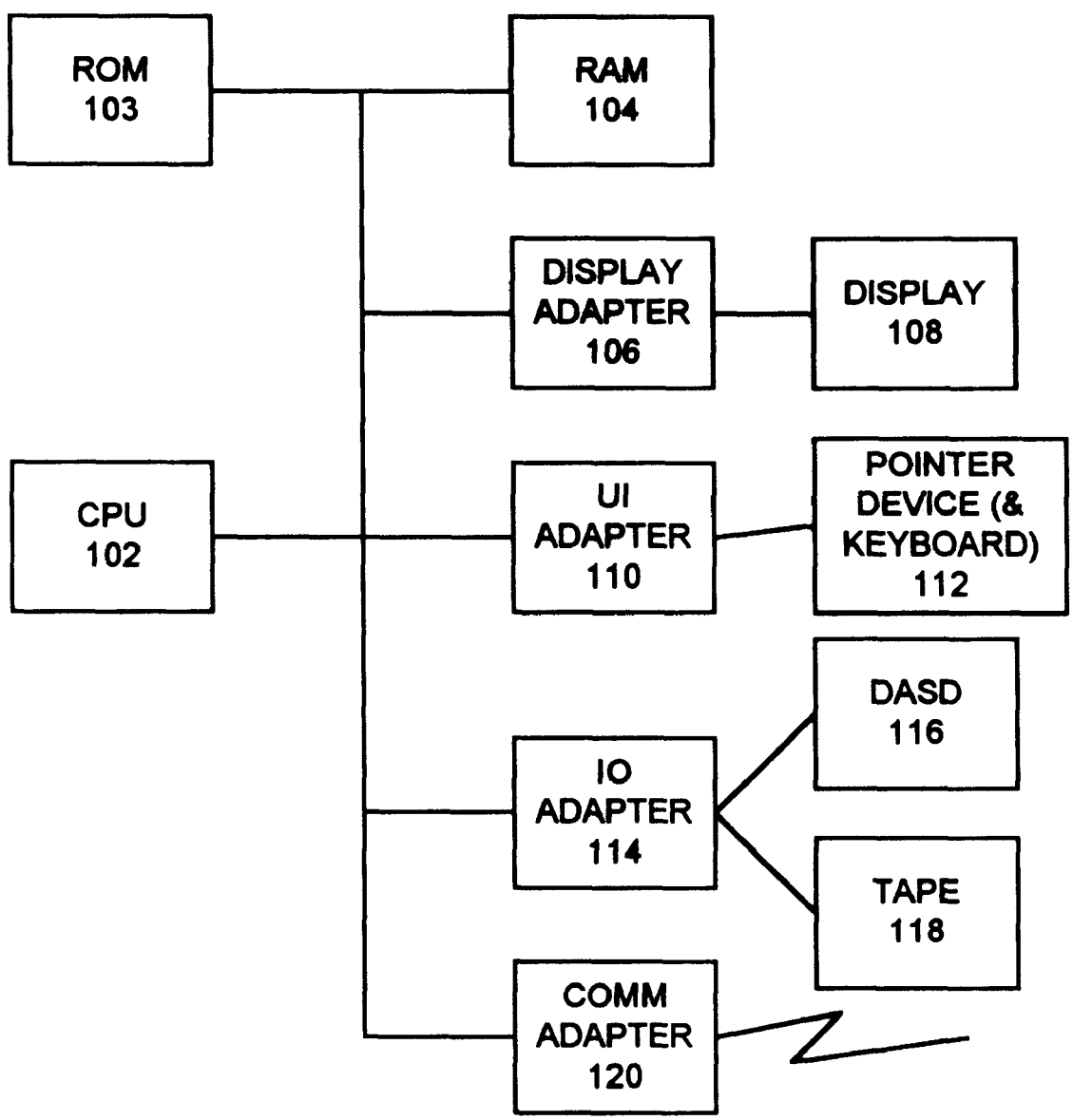
FIG. 1 is a block diagram representation illustrating a computer system for implementing methods for processing subquery join composites using hash join in accordance with the preferred embodiment.

Having reference now to the drawings, in FIG. 1, there is shown a computer or data processing system of the preferred embodiment generally designated by the reference character 100. As shown in FIG. 1, computer system 100 includes a central processor unit (CPU) 102, a read only memory 103, a random access memory or main memory 104, and a display adapter 106 coupled to a display 108. CPU 102 is connected to a user interface (UI) adapter 110 connected to a pointer device and keyboard 112. CPU 102 is connected to an input/output (IO) adapter 114 connected to a direct access storage device (DASD) 116 and a tape unit 118. CPU 102 is connected to a communications adapter 120 providing a communications function. It should be understood that the present invention is not limited to a computer model with a single CPU, or other single component architectures as shown in FIG. 1.

Various commercially available processors could be used for computer system 100, for example, an IBM personal computer or similar workstation can be used. An example of a specific computer system on which the invention may be implemented is the International Business Machines Corp.

AS/400 computer system. Central processor unit(s) 102 is suitably programmed to execute the flowcharts of FIGS. 4, 5A, 5B, 6A, 6B, 7A, 7B, 7C, 8A, 8B, and 8C to process subquery join composites using hash join of the preferred embodiment.

Figure 2:
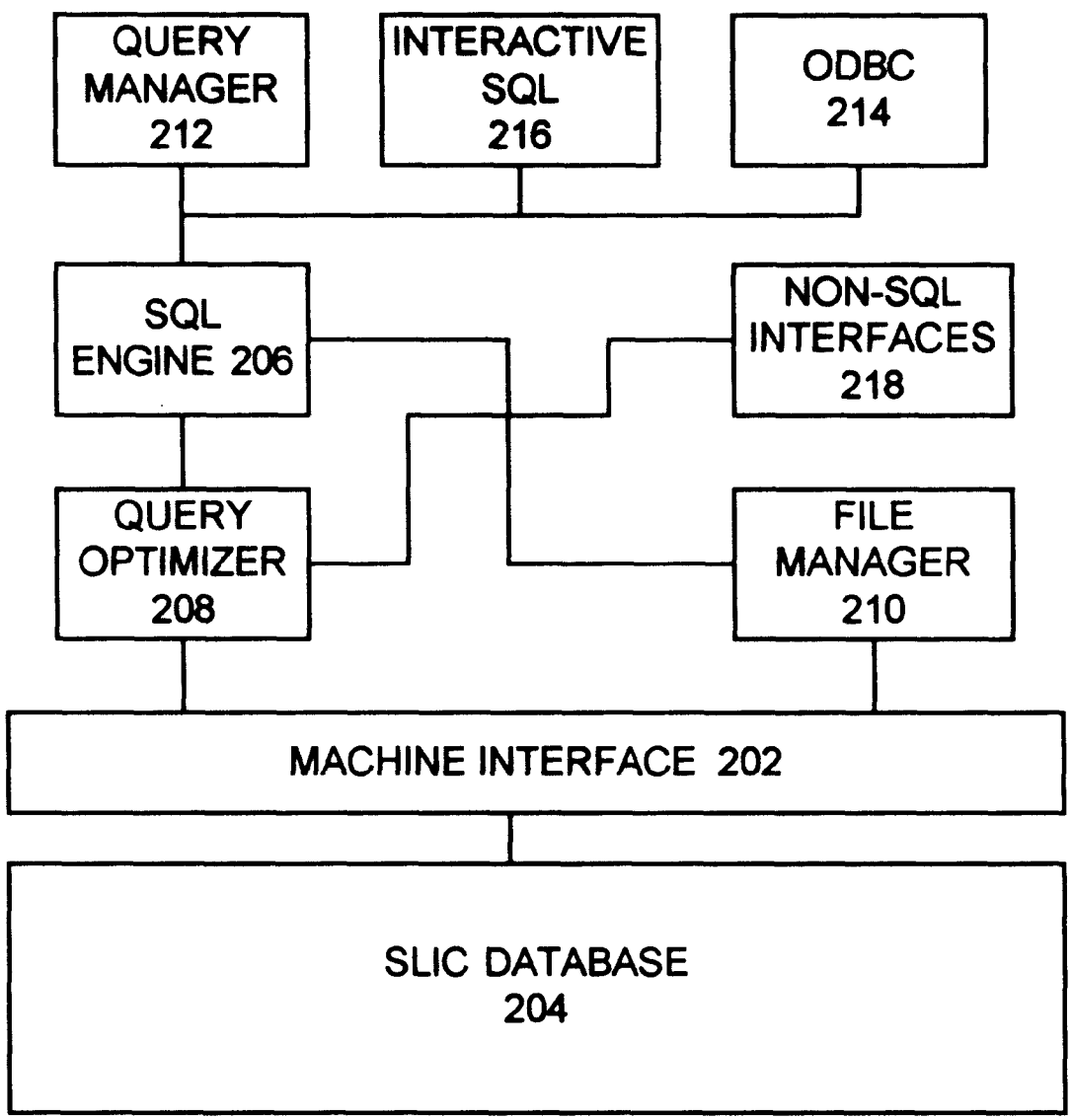
FIG. 2 is a block diagram representation illustrating an operating system of the computer system of FIG. 1.

Referring to FIG. 2, there is illustrated the DBz2/400database generally designated 200 integrated into the OS/400 operating system. The database 200 is separated into two parts by a Machine Interface (MI) 202. The MI 202 is a logical, not a physical interface to the system. The only way to communicate with the hardware and some of the system software below the MI is through the MI boundary 202. The MI architecture consists of a set of instructions that operate on objects. While OS/400 is not an object-oriented system, it is an object-based system. The MI interface 202 is used by all facets of the OS/400 operating system, including the DB2/400 database manager. Below the MI, are the machine dependent parts of the database manager and the low-level interfaces called System Licensed Internal Code (SLIC) database 204. This includes the low-level database access, the index manager, log manager (called journalling in DB2/400). Above the MI, are the query based user interfaces including a SQL engine 206, a query optimizer 208, and a database file system manager.

The SQL engine 206 receives an SQL statement through such interfaces such as a Query Manager 212 which is a end-user query tool, from an ODBC driver program 214, or an SQL precompiled program 216. The SQL engine parser 206 parses the statement verifying the syntactic validity of the statement and transforms the statements into an internal structure called the Query Definition Template (QDT). The QDT is passed to the query optimizer 208. The query optimizer 208 first validates the QDT and then optimizes the query. The DB2/400 query optimizer 208 is a cost-based optimizer. In its costing phase to determine the optimal query implementation, query optimizer 208 takes into account many factors including the table sizes, available indexes, expected result set size, machine speed, number of processors 102, and main memory 104 available. The end-user can control the number of processors 102 and the amount of main memory 104 that a query can use; these user-specified parameters are taken into account by the DB2/400 query optimizer 208. After the query optimizer 208 has determined how the query will be implemented, a cursor template is generated. The cursor contains the low-level implementation plan for the query; the join order, the indexes to be used in implementing the query, the grouping method to be used (hash or index). This cursor template is then passed below the MI 202 using an MI instruction, where a cursor object is generated. This cursor object contains executable code which runs when the row is fetched. This executable code also resolves derivations, selection, projection, and join. Query optimizer 208 provides the suitable programming for the central processor unit 102 to perform the methods of the preferred embodiment.

The hash join algorithm is implemented as a cooperative effort between the query optimizer 208 and the SLIC database level 204. The query optimizer 208 receives a join query and based on the costing algorithm determines whether hash join will perform better than a nested loop join implementation. The query optimizer 208 chooses the join order and if post-join processing will be needed. Post-join processing is needed for grouping, ordering, any non-equal selection that contains columns from more than one table, or resolution of expressions that contain columns from more than one table. The cost of post-join processing is included in the costing of the hash join algorithm. The nested loop algorithm costing may or may not include the cost of these items; it depends if these additional items can be included in one cursor object. After the query optimizer 208 has determined to use hash join, the original user query is decomposed into a set of smaller queries, one for each table referenced in the original query. For example, consider the following:

```
SELECT T1.EMPNAME, T2.DEPTNAME
    FROM EMPLOYEE T1, DEPARTMENT T2
        WHERE T1.DEPTNUM=T2.DEPTNUM
            AND T1.SALARY>50000 AND T2.DEPTNAME LIKE
            'ENG%'
```

This query is rewritten into new queries as follows where the record selection is applied to the appropriate query which reduces the hash table size.

```
Q1:   SELECT T1.EMPNAME, HASH_FUNCTION(T1.DEPTNUM)
          FROM EMPOYEE T1
              WHERE T1.SALARY>50000
Q2:   SELECT T2.DEPTNAME, HASH_FUNCTION(T2.DEPTNUM)
          FROM DEPARTMENT T2
              Where T2.DEPTNAME LIKE 'ENG%'
```

The query is rewritten into the QDT form. The query optimizer 208 is then recursively called in order to optimize each new query individually. This frees the query optimizer 208 from restrictions imposed on join queries and allows for better optimization of each single-file query. The cursors are created for each query. For the primary table, the result rows can be read from the cursor. For the secondary table, a hash table is built and returned when a read is done from its cursor.

In accordance with features of the preferred embodiment, the current hash join implementation is extended to support the new joins needed for subquery join composites. To support subquery join composites, the hash join has been modified to support a unique fanout join and a distinct fanout join on the inner join. Typically, hash join out performs nested loop for large sequential files. Hash algorithms can also take advantage of large memories to reduce the amount of I/O required. Also for multi-processor systems, hash algorithms can be easily parallelized.

The query optimizer 208 attempts to transform subqueries into joins whenever possible. Query optimizer 208 makes this choice again using the cost-based optimizer; however in almost every case the subquery join implementation has better performance characteristics than the subquery implementation.

Figure 3:
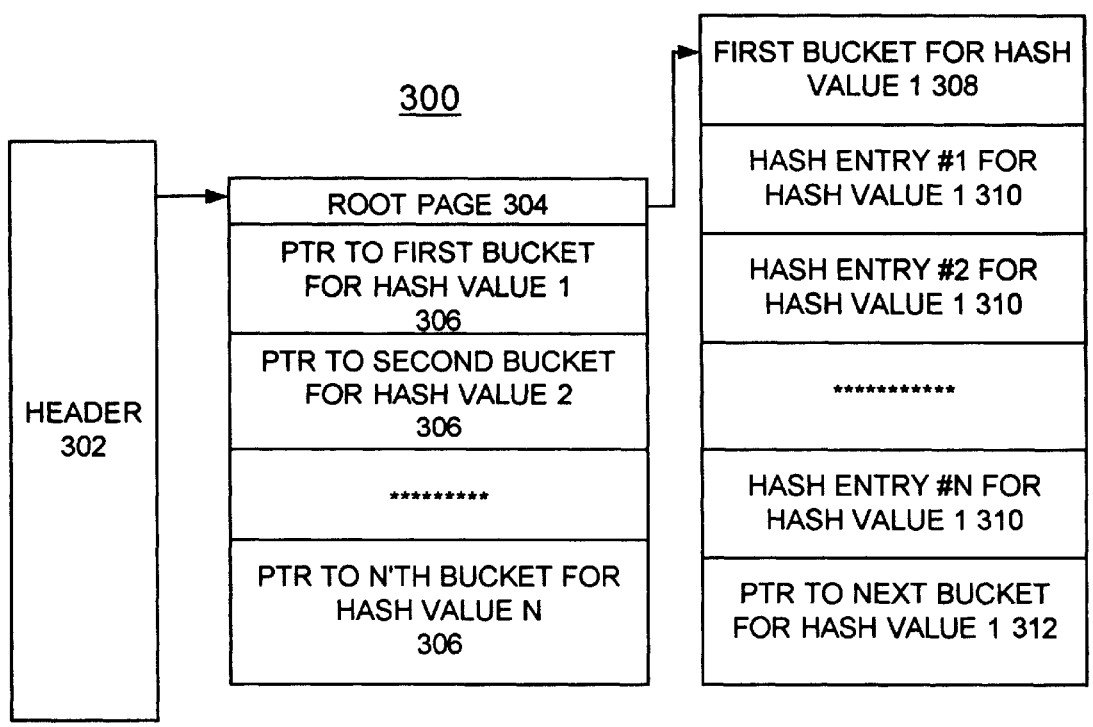
FIG. 3 is a block diagram representation illustrating a hash table structure of the preferred embodiment.

FIG. 3 illustrates the hash table structure generally designated 300. Hash table structure 300 includes a header 302 pointing to a root page 304 including multiple pointers 306 to buckets 308 for hash values 1-n. Buckets 308 store multiple hash entries 310 and a pointer 312 to a next bucket for respective hash values 1-n. Hash join is the method commonly used for inner equi-joins. The records for each file are hashed to the same hash point using the same hashing function on the join attributes A of R and B of S as hash keys. A single pass through each file hashes the records to the hash file buckets 308. This phase is called the build phase. Each bucket 308 is then examined for records from R and S with matching join attribute values to produce the result of the join operation, called the join phase.

There are only certain types of subqueries which can be transformed into joins by the DB2/400 query optimizer 208. These transformations are not described except where specifically applicable to the hash join implementation. The join pairs for the join composite are the correlated predicates. For all subqueries except the basic predicate subquery, the subquery predicate is also a join pair. For a basic predicated subquery, the subquery predicate must be evaluated after the join is complete.

Figure 4:
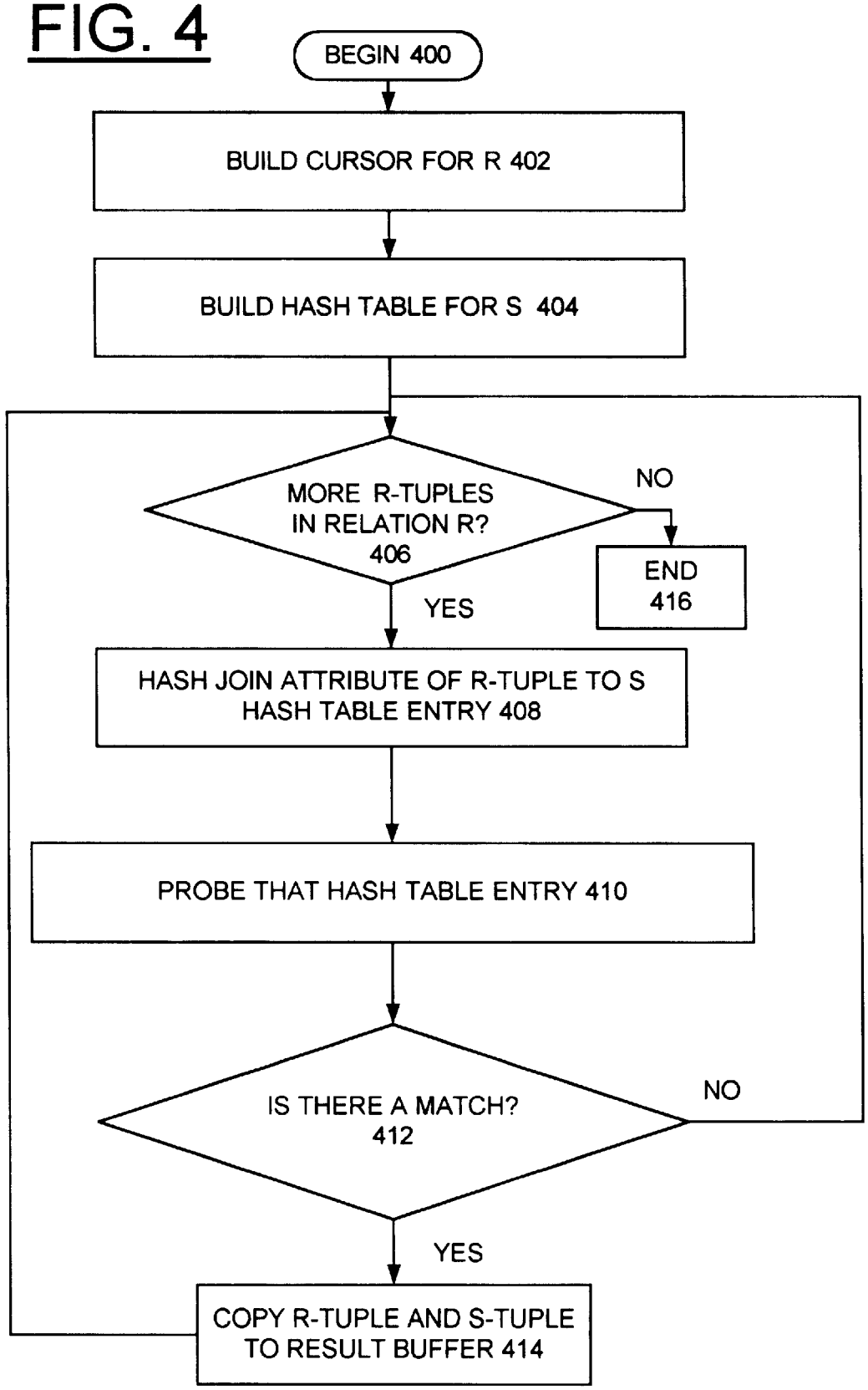
FIG. 4 is a flow diagram illustrating an inner hash join algorithm.

Referring to FIG. 4, and TABLE 1 below, exemplary steps performed starting at a block 400 and pseudo code for the hash join algorithm are shown. FIG. 4 illustrates the current inner join hash join algorithm (assuming R×S). As indicated at a block 402, a cursor is built for R, Then the hash table is built for S as indicated at a block 404. Then as indicated at block 406, 408, and 410, for each R-tuple in relation R, hash join attribute of R-tuple to S hash-table entry and that hash table entry is probed. While there is a match identified at decision block 412, then the R-tuple and S-tuple is copied to the result buffer.

Note, that the entire hash table can always be built and is not restricted to the amount of main memory 104 available on the system. However, performance will be much better if the hash table fits in main memory 104. The hash tables not fitting in main memory results in excess paging as the hash tables are paged into main memory.

Another feature of the hash algorithm is that a bit map is returned for the secondary that indicates if there is entry stored at the hash point. This bit map can then be used with other pieces of the query and indicates an interest only in records which have a hash value where the bit is ON. This limits the amount of data that is returned above the MI 202. This hash bit map can also be used in subsequent hash table builds and may reduce the hash table size.

Figure 5A:
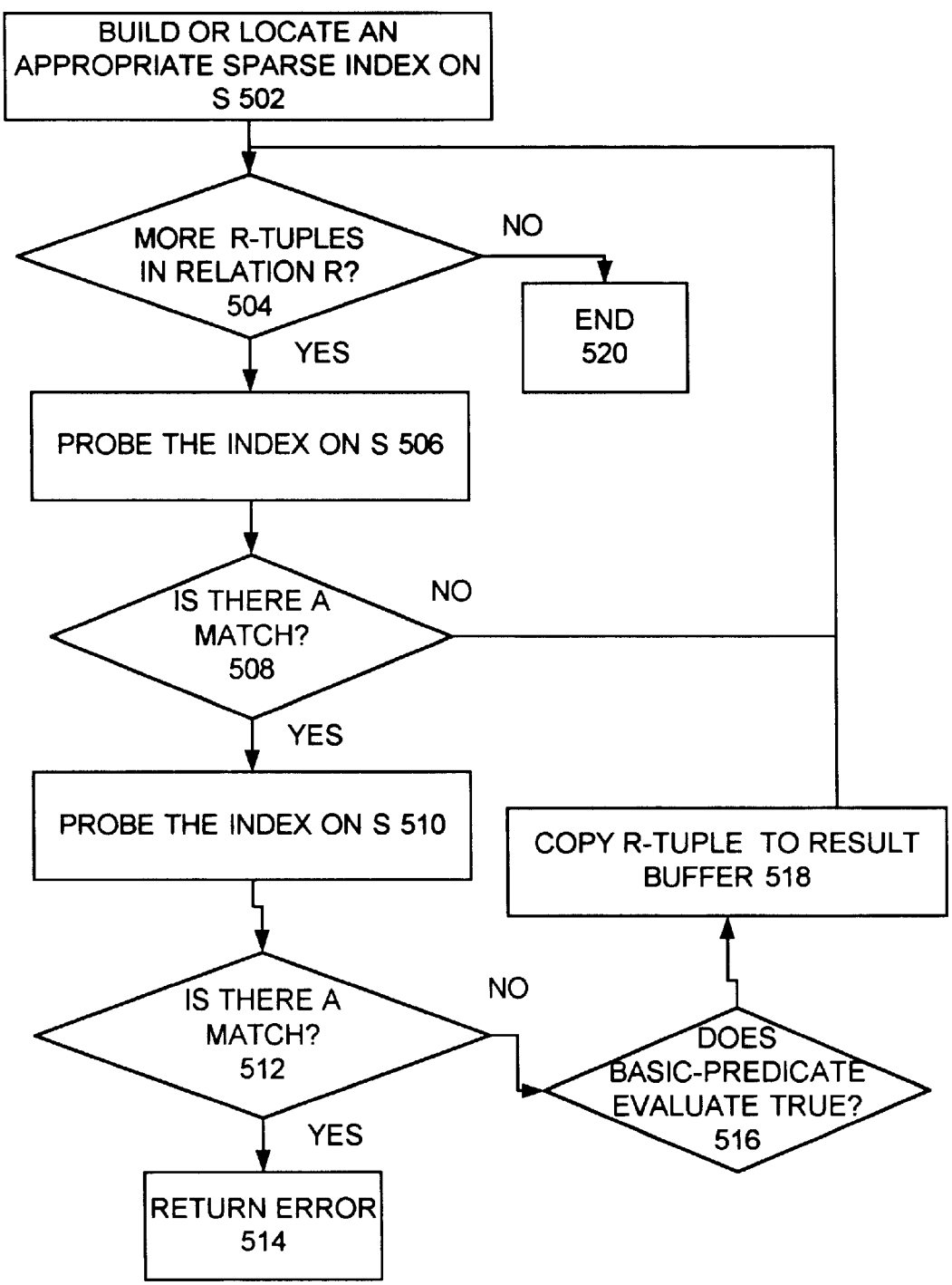
FIGS. 5A and 5B are flow diagrams illustrating methods for processing a nested loop join and an equivalent hash join supporting a unique fanout join.
Figure 5B:
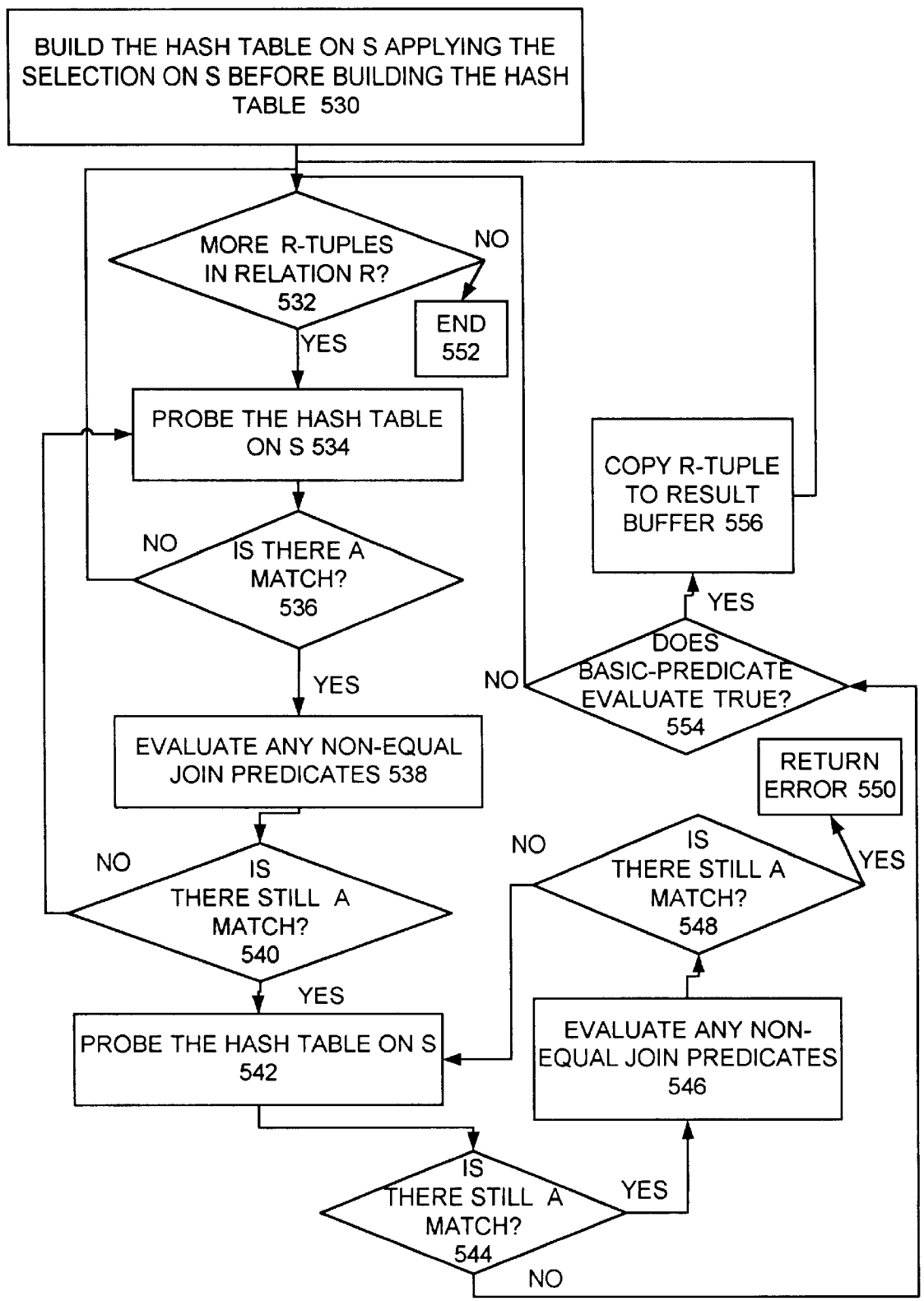

FIGS. 5A and 5B illustrate methods for processing a nested loop join and an equivalent hash join supporting a unique fanout join of the preferred embodiment. Pseudo code for the unique fanout join of the preferred embodiment is provided in TABLE 3 below.

In the unique fanout join variation, an error is returned if a row from the primary table joins to more than one row in the secondary. This type of join is used to support correlated basic predicate subquery join composites, where the result of the basic predicate subquery can only be one row. In this type of join, the basic predicate evaluation must be done after the determination of a match. This is due to the error checking required for more than one row returned. For a nested loop join, any non-join selection in the subquery must be performed prior to doing the join, this is done by building a select/omit (or sparse) index that has the subquery selection applied to it.

FIG. 5A illustrates the algorithm for the nested loop join. An appropriate sparse index is build or located on S as indicated at a block 502. For each R-tuple identified at decision block 504, the index is probed on S as indicated at a block 506. If there is a match identified at decision block 508, then the index is probed on S as indicated at a block 510. If there is a match identified at decision block 512, then an error is returned. If the basic-predicate evaluates true at decision block 516, then the R-tuple is copied to the result buffer as indicated at a block 518.

FIG. 5B illustrates an equivalent hash join unique fanout join algorithm. The hash join algorithm of FIG. 4 has been modified to add support for non-equal join predicates since the current hash join only supports equal join predicates and all join predicates must be evaluated prior to evaluating the basic predicate. Also support is provided to issue an error if results are placed in an intermediate table and then a query runs over that table.

In FIG. 5B, the algorithm for hash join starts with building the hash table on S applying the selection on S before building the hash table as indicated at a block 530. Then for each R-tuple, the hash table on S is probed as indicated at blocks 532 and 534. If there is a match identified at decision block 536, then any non-equal join predicates are evaluated as indicated at a block 538. If there is a still a match identified at decision block 540, then the hash table on S is probed at block 542. If there is a match identified at decision block 544 then any non-equal join predicates are evaluated at block 546. If there is a match identified at decision block 548, then an error is returned at block 550. If the basic-predicate evaluates true at decision block 554, then the R-tuple is copied to the result buffer as indicated at a block 556.

Figure 6A:
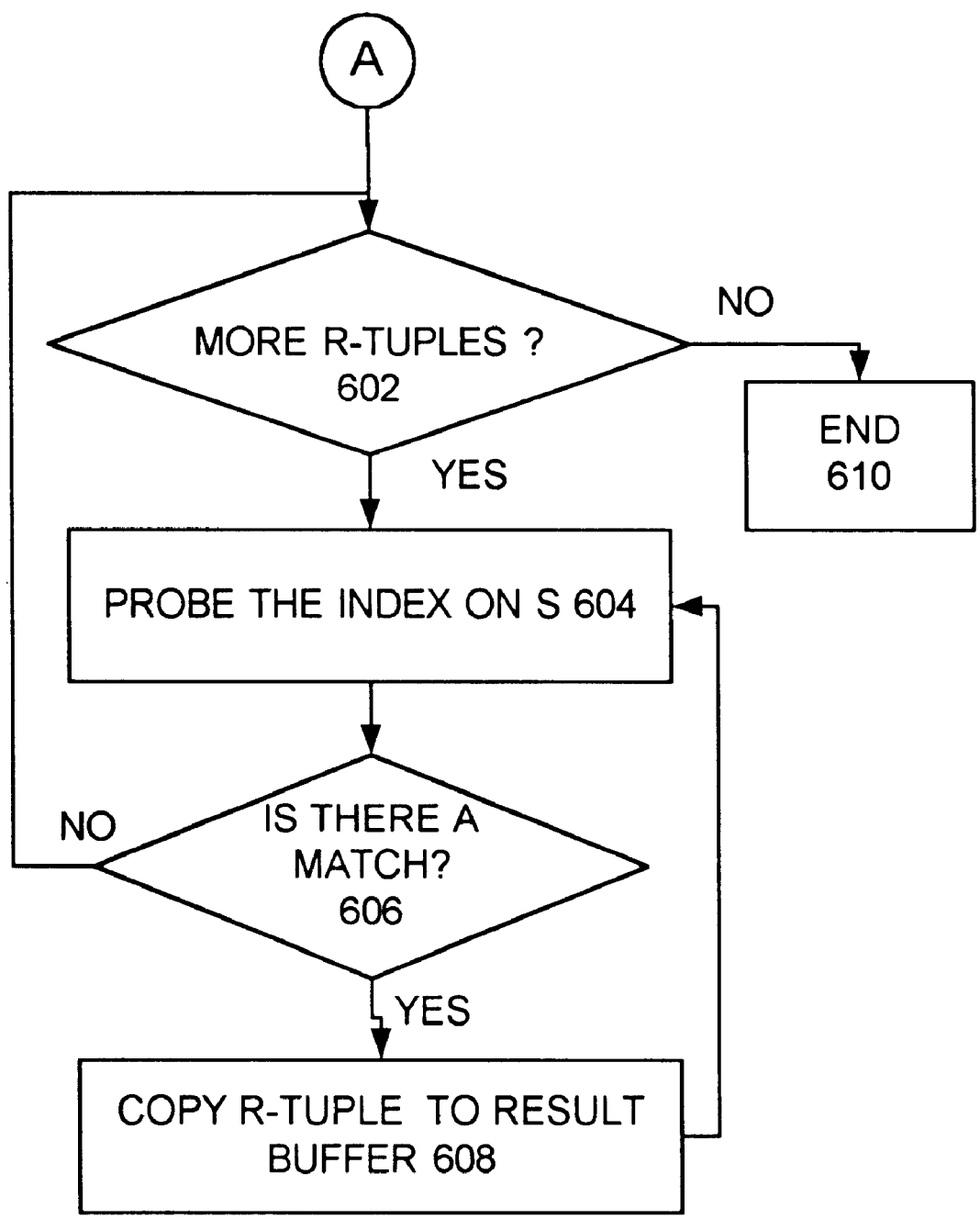
FIGS. 6A and 6B are flow diagrams illustrating methods for processing a nested loop join and an equivalent hash join supporting a distinct fanout join.
Figure 6B:
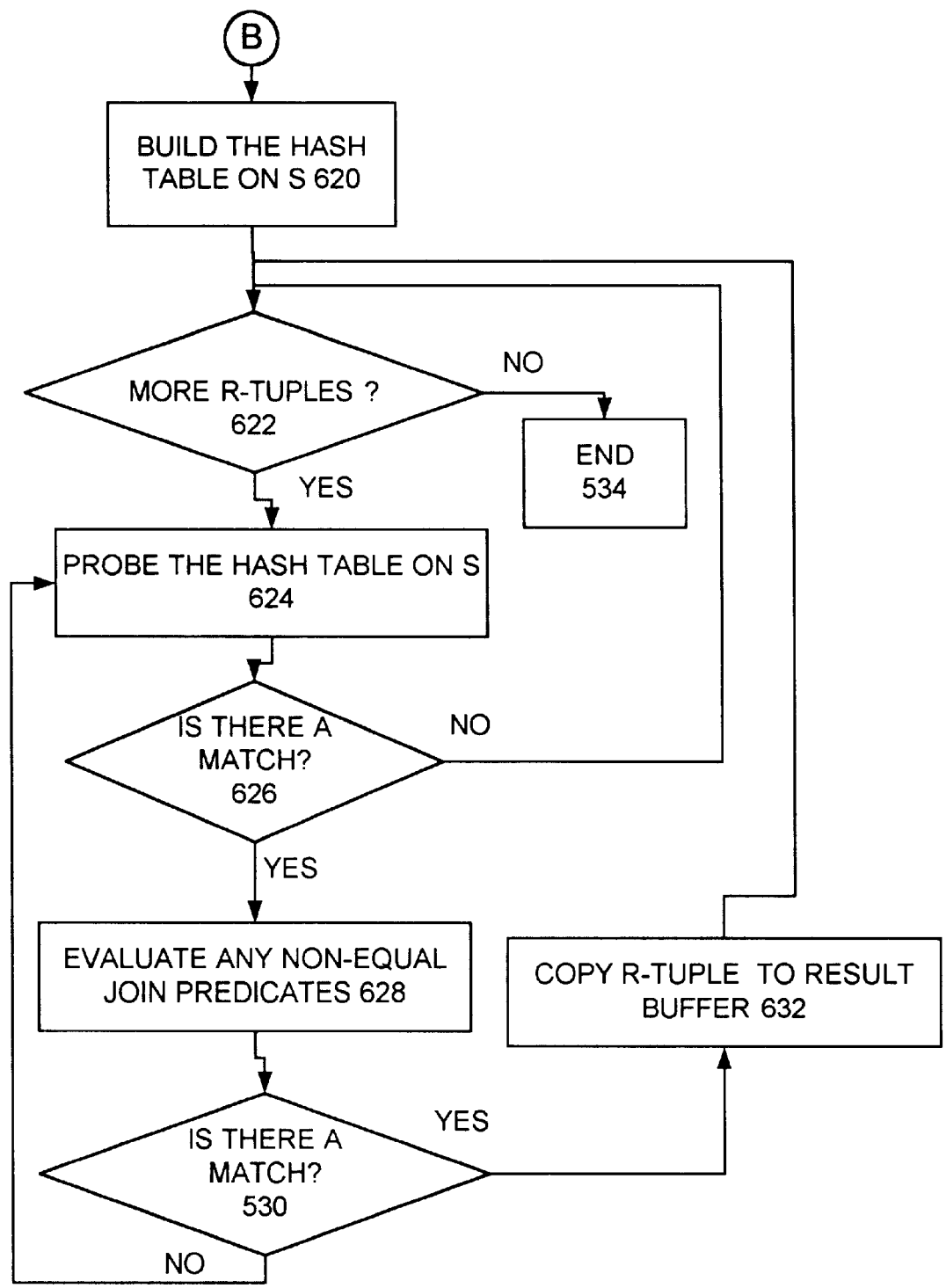

FIGS. 6A and 6B illustrate methods for processing a nested loop join and an equivalent hash join supporting a distinct fanout join. Pseudo code for the distinct fanout join of the preferred embodiment is provided in TABLE 2 below.

In the distinct fanout join, if the row from the primary table joins to a row from the secondary, then the row is returned and the join advances to the next row of the primary table without checking if there are any more matches on the secondary. The distinct fanout join is used to support correlated EXISTS, uncorrelated and correlated IN, and quantified uncorrelated and correlated ANY subquery join composites. Since this join type has no error checking the subquery predicate can be evaluated as part of the join.

Referring to FIG. 6A, the nested loop algorithm for the distinct fanout join is shown. For each R-tuple identified at decision block 602, the index on S is probed as indicated at a block 604. If there is a match identified at decision block 606, then the R-tuple is copied to the result buffer. This ends the process as indicated at a block 610.

Referring to FIG. 6B, an equivalent hash join supporting the distinct fanout join is shown. The hash join implementation for the distinct fanout join supports non-equal join predicates during the evaluation. Since this support was needed for the unique fanout join, support for non-equal join predicates during the evaluation is incorporated into the distinct fanout join algorithm to provide better performance by eliminating the need for a query over an intermediate result to process the non-equal join criteria.

In 6B, the equivalent hash join algorithm for distinct fanout join begins with building the hash table on S as indicated at a block 620. For each R-tuple identified at decision block 622, the hash table on S is probed as indicated at a block 624. If there is a match identified at decision block 626, then any non-equal join predicates are evaluated as indicated at a block 628. If there is still a match identified at decision block 630, then the R-tuple is copied to result buffer as indicated at a block 632. Note that the probe and non-equal join evaluation continues until a match is found or no more probes are possible on S.

Figure 7A:
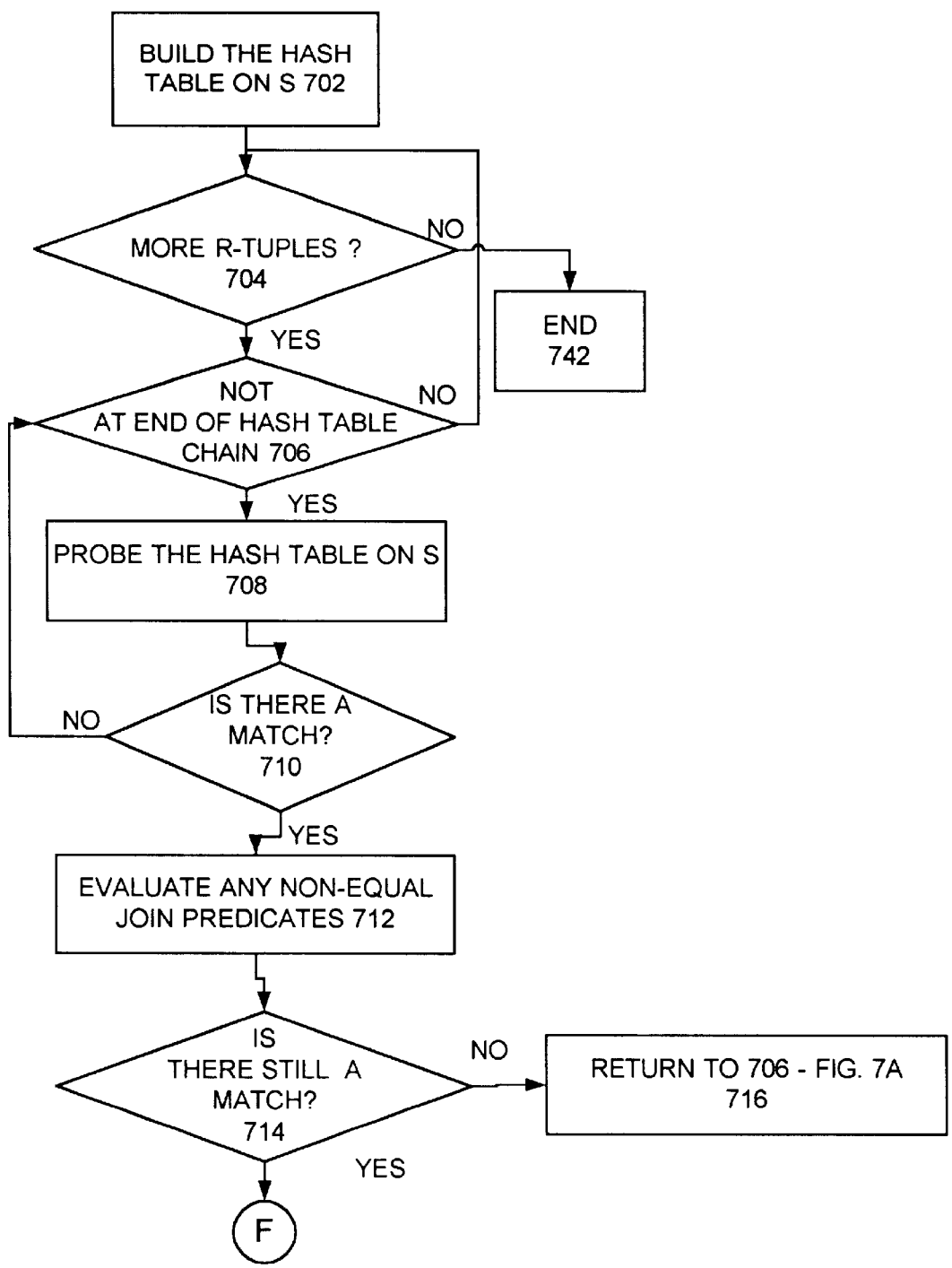
FIGS. 7A, 7B, 7C together provide a flow diagram illustrating methods for processing subquery join composites using hash join including unique and distinct fanout join in accordance with the preferred embodiment.
Figure 7B:
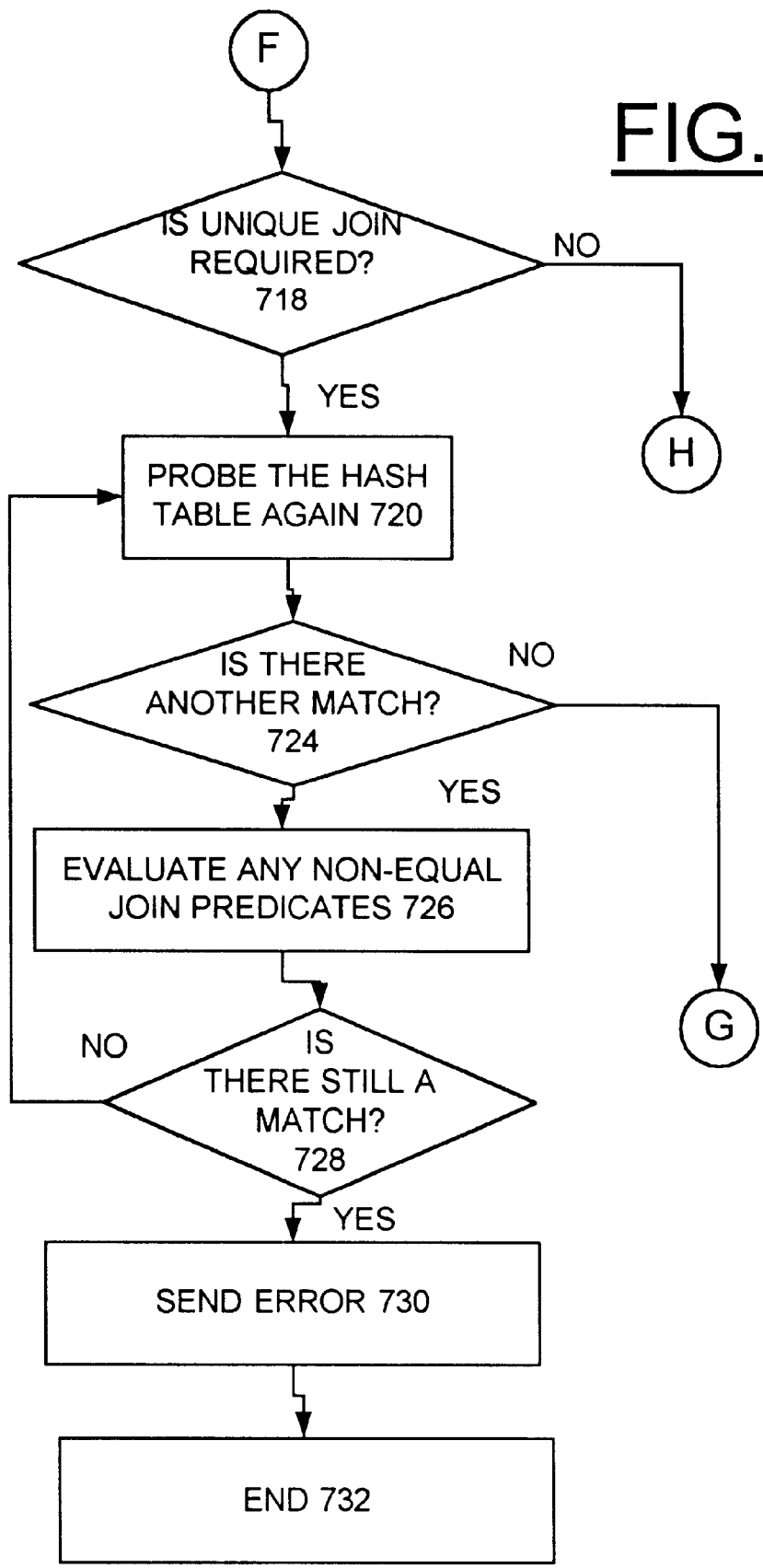
Figure 7C:
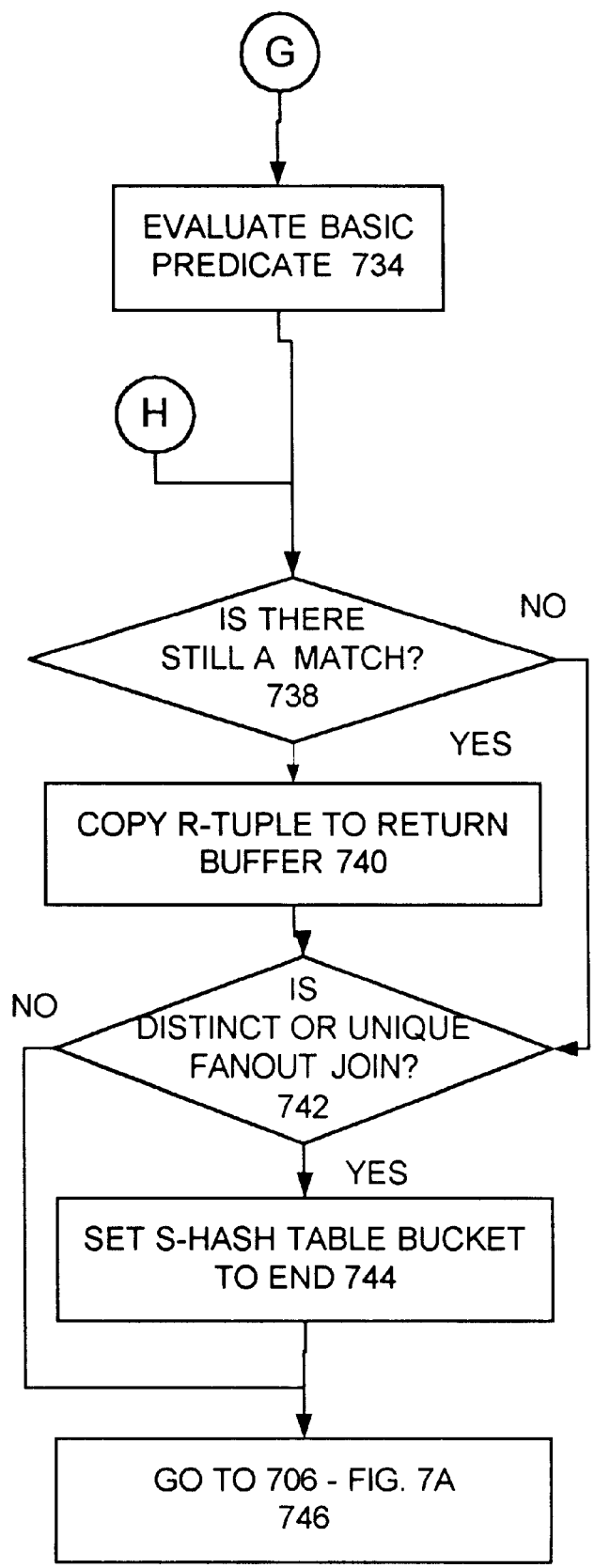

FIGS. 7A, 7B, and 7C illustrate the hash join incorporating both the unique and distinct fanout join. As indicated at a block 702, a hash table is built on S. For each R-tuple the hash table is probed as indicated at decision blocks 704 and 706 and at block 708. If there is match identified at block 710, then any non-equal join predicates are evaluated at block 712. If still a match identified at block 714, then following entry point F in FIG. 7B, if a unique join is required then the hash table is probed again as indicated at blocks 718 and 720. If another match is identified at decision block 724, then any non-equal join predicates are evaluated at block 726. If still a match identified at decision block 728, then an error is sent and the sequential steps end as indicated at a block 732. Else when a match is not identified at decision block 728, then the basic-predicate predicate is evaluated at block 734. If still a match then the R-tuple is copied to the result buffer as indicated at block 738. If distinct or unique fanout join is identified at decision block 742, then the S-hash table bucket is set to end as indicated at a block 744. Processing continues at block 706 in FIG. 7A as indicated at a block 746.

Figure 8A:
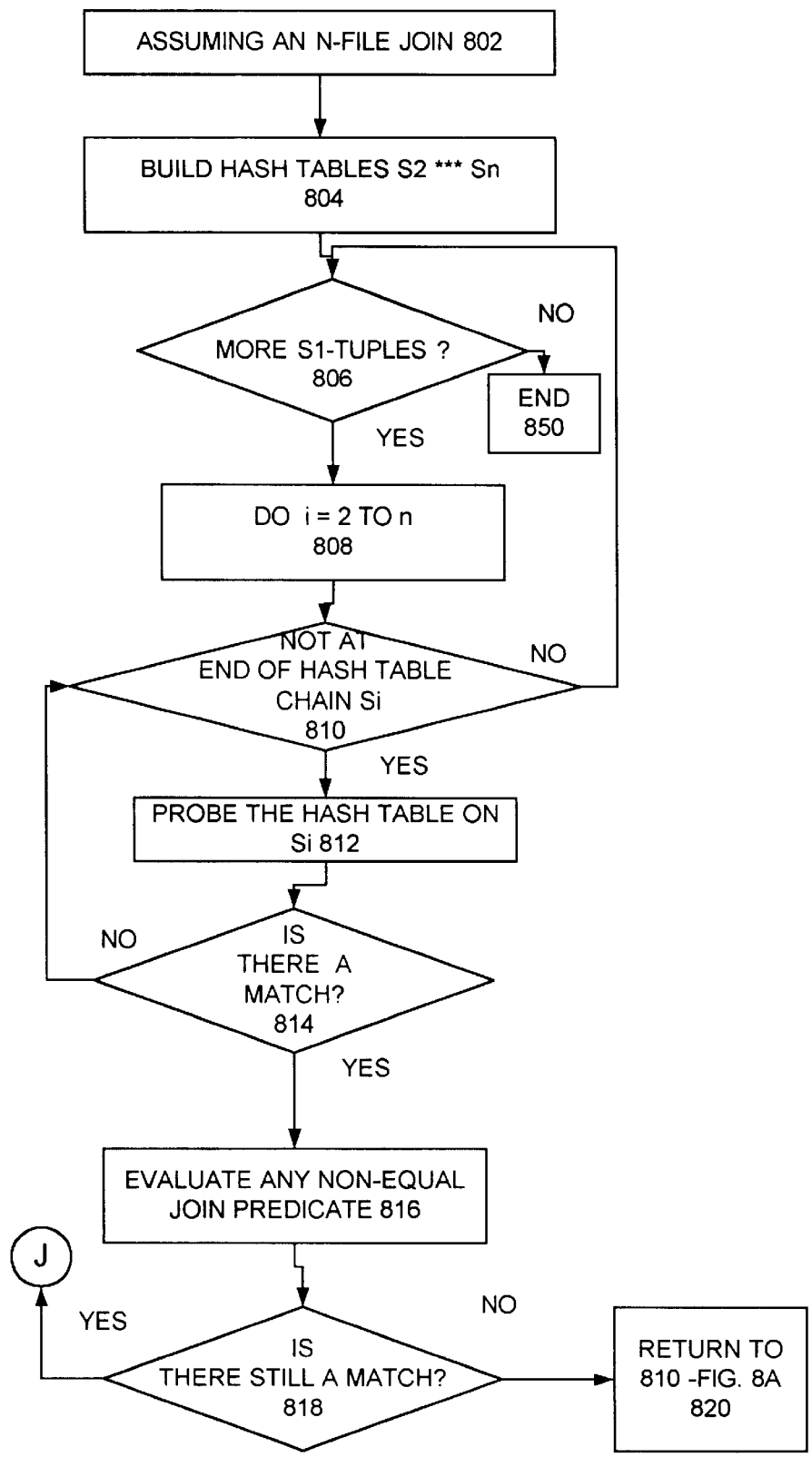
FIGS. 8A, 8B, 8C are flow diagrams illustrating methods for processing subquery join composites using hash join including unique and distinct fanout join where multiple files can be joined at one time in accordance with the preferred embodiment.
Figure 8B:
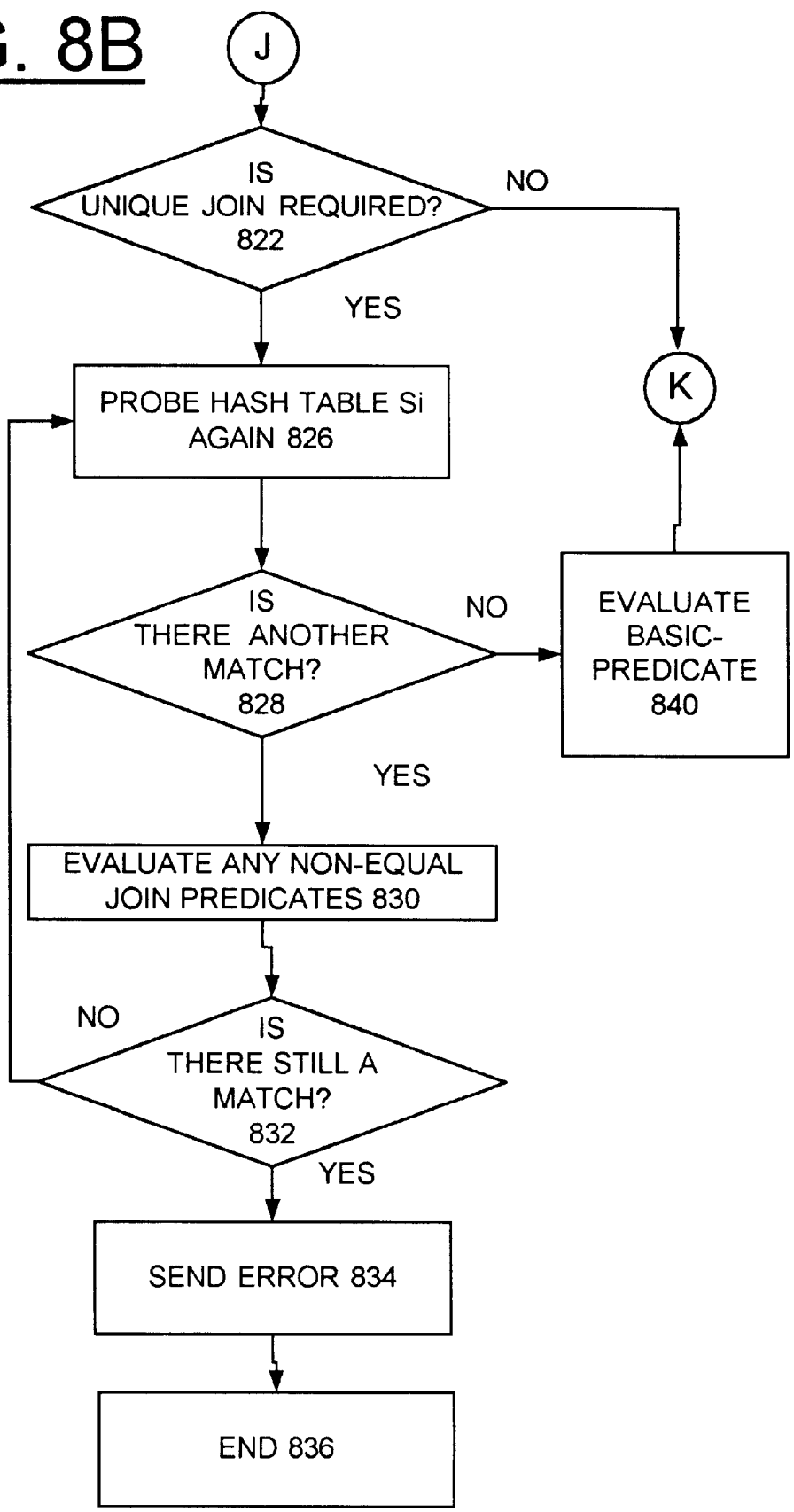

FIGS. 8A and 8B illustrate a hash join supporting multiple file join or where three or more files can be joined at one time. The distinct and unique fanout join support is incorporated into the hash join supporting multiple file join. The hash join supporting multiple file join supports when to spin the dial and when to advance to a next dial. As indicated at a block 800, an n-file join is assumed. The hash table is built on $S_2 \ldots S_n$. For each $S_1$=tuple, do i=2 to n and while not at end of $S_i$ hash table chain, the hash table on $S_i$ is probed as indicated at blocks 806, 808, 810 and 812. If there is match identified at decision block 814, then any non-equal join predicates are evaluated. If there is not a match identified at decision block 818, then the record is put into the buffer as indicated at a block 820. If there is still a match identified at decision block 818 following entry point J in FIG. 8B, then if unique join is required, the hash table is probed again as indicated at blocks 822 and 824. If another match is identified at decision block 828, then any non-equal join predicates are evaluated as indicated at a block 830. If there is still a match identified at decision block 832, then an error is sent as indicated at a block 834. If not, the record is copied to the buffer at block 836. Else if another match is not identified at block 828, the basic-predicate predicate is evaluated as indicated at a block 840 and the record is copied if the basic predicate evaluates true.

Figure 8C:
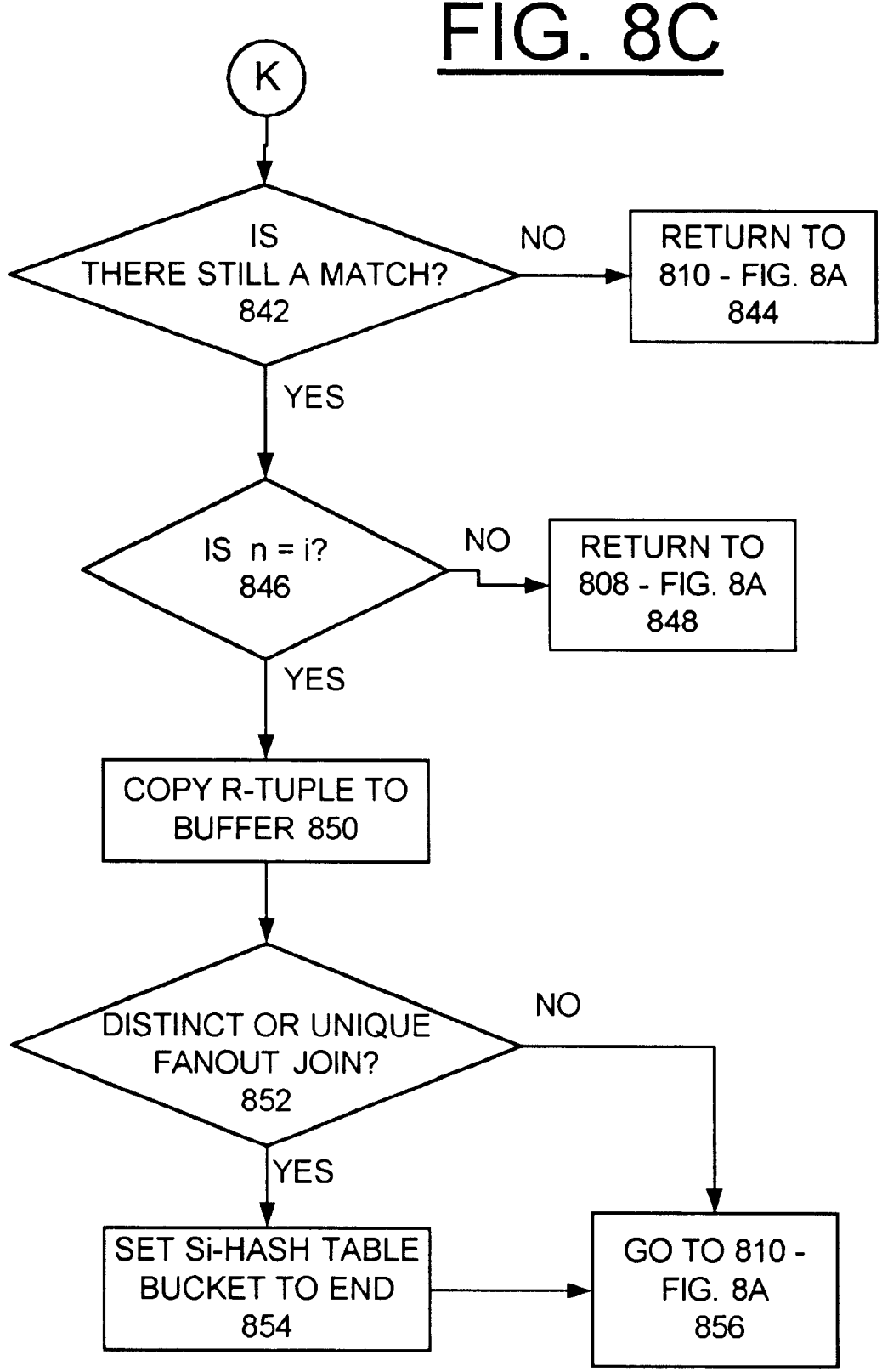

In FIG. 8C, if a match is not identified at decision block 842, then the sequential steps return to block 810 in FIG. 8A as indicated at block 844. If there is still a match identified at block 842, then it is determined if n=i as indicated at decision block 846. If not, then the sequential steps return to block 808 in FIG. 8A as indicated at a block 848. Otherwise, the R-tuple is copied to the result buffer as indicated at a block 850. If distinct or unique fanout join is identified at decision block 852, then the Si-hash table bucket is set to the end as indicated at a block 854. Otherwise, the sequential steps return to block 810 in FIG. 8A as indicated at a block 856.

For example, the hash join algorithm of the preferred embodiment allows a subquery join composite to be composed and evaluated for a query that is of the following form:

```
SELECT T1.NAME,T2.DEPTNAME
    FROM T1.EMPLOYEE, T2.DEPARTMENT
    WHERE T1.DEPTNUM=T2.DEPTNUM
        AND T1.PROJNO IN (SELECT PROJNO
                          FROM PROJECTS P
                          WHERE T1.PROJNO
                          =P.PROJNO
                                AND PRIORITY='HIGH')
        AND T2.DEPTLOC = (SELECT LOC
                          FROM LOCATIONS L
                          WHERE T1.ADDRESS
                          =L. ADDRESS)
```

In the above exemplary subquery join composite, the EMPLOYEE and DEPARTMENT table will be joined using the standard hash join algorithm allowing for a full fanout. PROJECTS will then be joined using the distinct fanout join, and LOCATIONS will be joined using the unique fanout join.

FIGS. 9A, 9B, 10 and 11 illustrate performance measurements run on AS/400 9406-S20 running V4R2M0 OS/400. This system is a 4-way multiprocessor with 4 G of main memory and 63 G of DASD. The queries were run in the interactive job pool which was allocated 300 M of main memory. The tables used were from the TPCD 1 GB benchmark and the system catalog tables. The queries were run twice and the measurements taken on a the second run, this allowed for as much of the tables as possible to be loaded in to memory. Since this is a multi-processor system, the queries were run once in single processor mode and a second time where the query optimizer could take advantage of all 4 processors using the Symmetric Multiprocessor (SMP) option of DB2/400.

Referring to FIG. 9A, there is shown a chart illustrating table sizes for the performance measurements. For the UNIQUE fanout join 4 queries were run as follows:

```
Q1:  SELECT COUNT(*)FROM TPCDIGB.CUSTOMER
         WHERE C_CUSTKEY IN
             (SELECT O_CUSTKEY FROM TPCDIGB.ORDERS)
Q2:  SELECT N.N_NATIONKEY,N_NAME,COUNT(*)
         FROM TPCDIGB.CUSTOMER C, TPCDIGB.NATION N
         WHERE C_CUSTKEY IN
             (SELECT O_CUSTKEY FROM
     TPCDIGB.ORDERS)
             AND C.C_NATIONKEY=N_NATIONKEY
         GROUP BY N.N_NATIONKEY,N_NAME
         ORDER BY N_NAME
Q3:  SELECT COUNT(*)FORM TPCDIGB.CUSTOMER A
         WHERE C_CUSTKEY IN
             (SELECT O_CUSTKEY FORM TPCDIGB.ORDERS
                 WHERE O_TOTALPRICE<100000)
Q4:  SELECT N.N_NATIONKEY,N_NAME,COUNT(*)
         FROM TPCDIGB.CUSTOMER C, TPCDIGB.NATION N
         WHERE C_CUSTKEY IN
             (SELECT O_CUSTKEY FROM
                 TPCDIGB.ORDERS O,
                 TPCDIGB.LINEITEM L
                 WHERE O_TOTALPRICE<100000 AND
                     O.O_ORDERKEY=L.L_ORDERKEY
                     AND L.L_SUPPKEY=9986)
             AND C.C_NATIONKEY=N_NATIONKEY
         GROUP BY N.N_NATIONKEY,N_NAME
         ORDER BY N_NAME
```

Referring to FIG. 9B, performance results are shown. For Q1 and Q2, nested loop join is a better implementation choice. The nested loop join method used an existing index on ORDERS. For hash join since there is no additional selection, there are approximately 23 entries in the hash bucket (64K hash points) and there are 100,000 unique values in ORDERS. The time to search the hash chains is more than the time to probe using the index. This same behavior has been seen with current inner hash joins. The hash join implementation was able to apply the subquery selection as to the split query. It was also able to take advantage of hash bit map processing to reduce the number of rows returned for the outer query. For Q4, in the nested loop implementation, the optimizer 208 builds index for orders, it uses existing indexes on customer, nation, and line item. In the hash join case, the query optimizer 208 decides to do nested loop on customer and nation, and hash join for orders and line item. As expected for all four queries, building the hash tables in parallel improves the response (or wall clock) time.

Referring to FIG. 10, an example for performance measurements for the unique fanout join is shown. In FIG. 10, SYSINDEXES is a view defined as a 3-way join. Three queries were run as follows.

```
Q5:  SELECT INDEX_NAME FROM QSYS2.SYSINDEXES A
        WHERE INDEX_OWNER < >
          (SELECT TABLE_OWNER FROM QSYSS2.SYSTABLES B
            WHERE A.TABLE_NAME=B.TABLE_NAME AND
              A.TABLE_SCHEMA=B.TABLE_SCHEMA)
Q6:  SELECT A.COLUMN_NAME FROM QSYS2.SYSCOLUMNS A
        WHERE A.COLUMN_NAME=
          (SELECT B.TABLE_NAME FROM QSYS2.SYSTABLES B
            WHERE A.TABLE_NAME=B.TABLE_NAME AND
              A.TABLE_SCHEMA=B.TABLE_SCHEMA)
Q7:  SELECT A.COLUMN_NAME FROM QSYS2.SYSCOLUMNS A
        WHERE A.COLUMN_NAME=
          (SELECT B.TABLE_NAME FROM QSYS2.SYSTABLES B
            WHERE A.TABLE_NAME=B.TABLE_NAME AND
              A.TABLE_SCHEMA=B.TABLE_SCHEMA
                AND B.TABLE_SCHEMA LIKE 'TPCDIGB')
```

Referring to FIG. 11, performance results are shown. For Q5, in the hash join implementation, SYSINDEXES was implemented using nested loop and then was hash joined to SYSTABLES. Q7 performed better than Q6 for hash join because it was able to use the hash bit map processing to reduce the hash table size and to limit the number of rows returned for SYSCOLUMNS. SMP was not used for these queries because the table sizes were too small. The optimizer 208 decided that the SMP start-up costs was greater than the benefit of running in parallel.

Figures 12A, 12B:
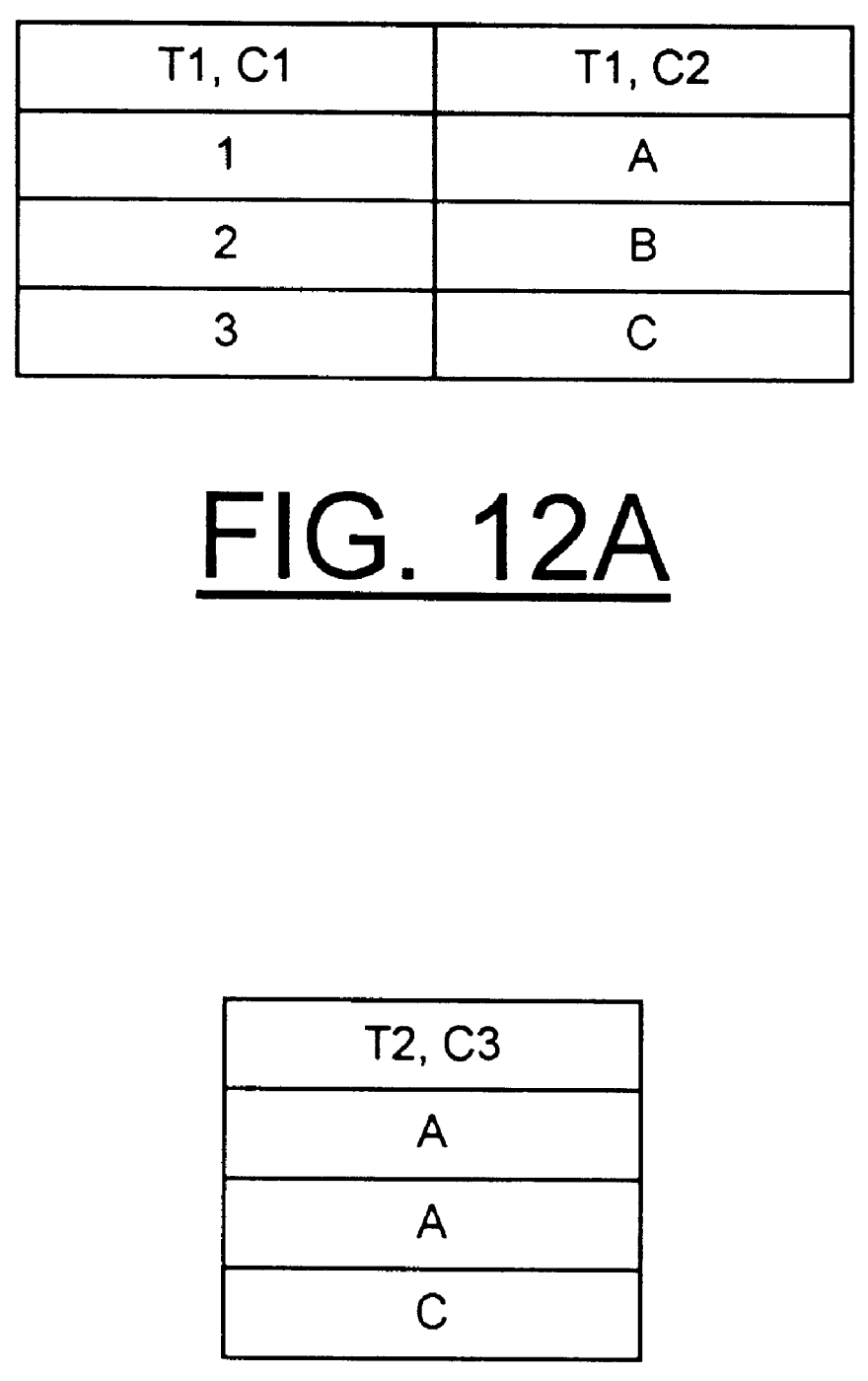

Referring to FIGS. 12A and 12B, a detailed example of subquery join composites follows using tables T1 and T2 containing the data. First consider an example for distinct fanout join given an IN subquery as follows.

SELECT T1.C1 FROM T1
    WHERE T1.C2 IN (SELECT T2.C3 FROM T2)

Subquery join composite is:

SELECT T1.C1 FROM T1 DISTINCT INNER JOIN T2 ON T1.C1=T2.C3
1. Read the first record from T1 (1,A).
2. The hash table on T2 is probed resulting in a match since there is an 'A' in T2.C3.
3. The results are mapped to the output buffer, returning C1 in this case.
4. In a normal inner join, processing would probe the hash table on T2.C3 and determine that there is another match. In this case, since it is a distinct join, we are not interested in additional matches since the IN subquery selection predicated for row (1,A) of T1 has already been satisfied.
5. Read the next record for T1 (2,B).
6. The hash table on T2 is probed, resulting in no matches. The record is not returned to the user.
7. Read the next record for T2 (3,C).
8. The hash table on T2 is probed resulting a match since there is a 'C' in T2.C3
9. The results are mapped to the output buffer.
10. Attempt to read the next record from T1, resulting in end-of-file.
11. Return the records to the user.

Next consider an example for unique fanout join given a basic predicate subquery as follows.

```
SELECT T1.C1 FROM T1
    WHERE T1.C1 = (SELECT 1
                    FROM T2
                      WHERE T1.C2=T2.C3
                        AND T2. .C3>'A')
```

Subquery join composite is:
SELECT T1.C1 FROM T1 UNIQUE INNER JOIN T2 ON T1.C1=T2.C2 and T2.C3>'A'
    WHERE T1.C1=1
1. Read the first record from T1 (1,A).
2. The hash table on T2 is probed resulting in no matches, since C3='A' was eliminated by the selection.
3. Read the next record from T1 (2,B).
4. The hash table on T2 is probed resulting in no matches.
5. Read the next record from T1 (3,C).
6. The hash table on T2 is probed resulting in a match. The hash table is probed again, looking for another match; however there is no match.
7. The results are mapped to the output buffer.
8. Attempt to read the next record from T1, result in end-of-file.
9. Return the record to the user Consider an error case for unique fanout join given a basic predicate subquery as follows.

```
SELECT T1.C1 FROM T1
    WHERE T1.C1 =(SELECT 1
                    FROM T2
                      WHERE T1.C2=T2.C2)
```

Subquery join composite is:
SELECT T1.C1 FROM T1 UNIQUE INNER JOIN T2 ON T1.C1=T2.C2 WHERE T1.C1=1
1. Read the first record from T1 (1,A).
2. The hash table on T2 is probed resulting in a match since there is an 'A' in T2.C3.
3. Since there was a match, the hash table is again probed and another match is found, resulting in an error, since the basic predicate subquery can only return 1 result.

Figure 13:
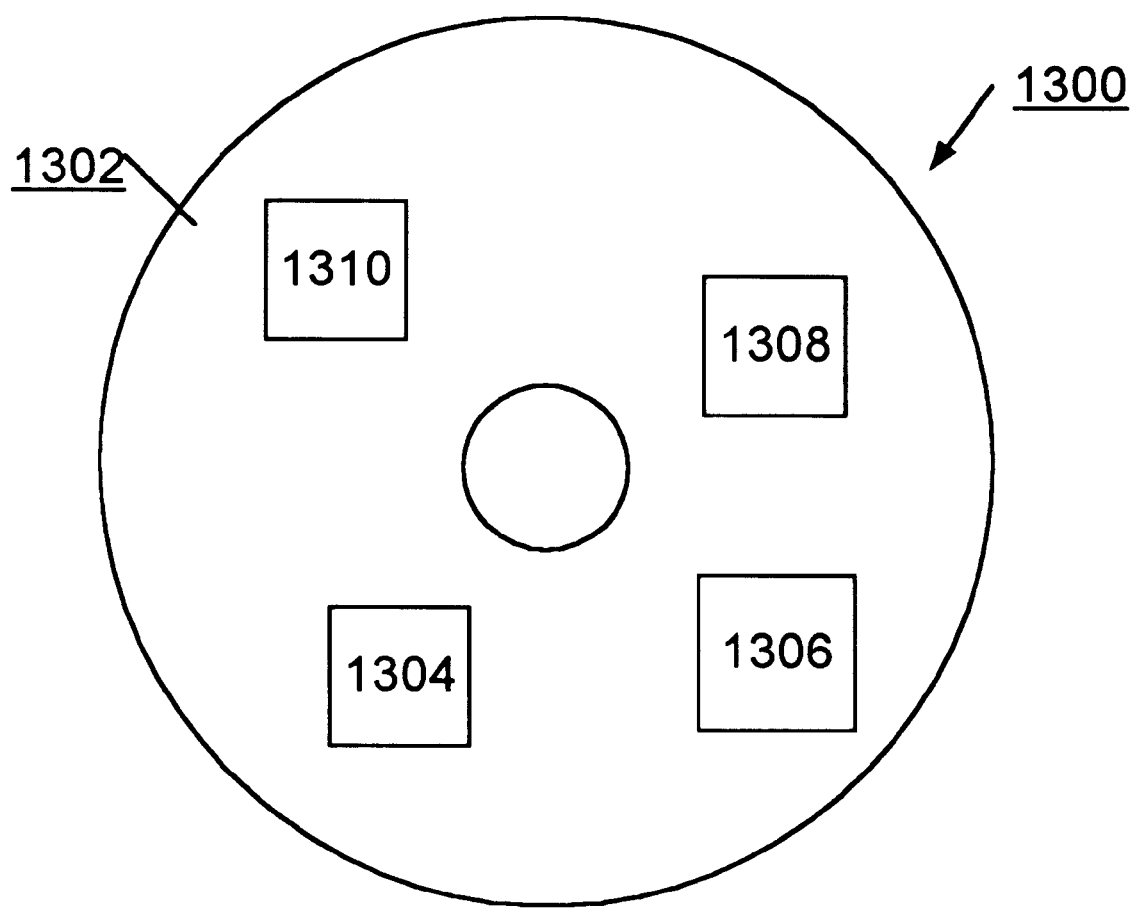
FIG. 13 is a block diagram illustrating a computer program product in accordance with the preferred embodiment.

Referring now to FIG. 13, an article of manufacture or a computer program product 1300 of the invention is illustrated. The computer program product 1300 includes a recording medium 1302, such as, a floppy disk, a high capacity read only memory in the form of an optically read compact disk or CD-ROM, a tape, a transmission type media such as a digital or analog communications link, or a similar computer program product. Recording medium 1302 stores program means 1304, 1306, 1308, 1310 on the medium 1302 for carrying out the subquery join composite methods using hash join of the preferred embodiment in the system 100 of FIGS. 1 and 2.

A sequence of program instructions or a logical assembly of one or more interrelated modules defined by the recorded program means 1304, 1306, 1308, 1310, direct the computer system 100 for implementing subquery join composite methods using hash join of the preferred embodiment.

TABLE 1

Hash join algorithm:

Assume tables R and S are being joined, where S is the primary dial.
Build a hash table for R
Read a record from S
DO UNTIL no more records in S
    Probe hash table of R using join field from record of
        S
    IF match found then
        DO UNTIL no more matches found
            build output buffer to return to user
            probe next hash point in R looking for
            additional matches
        END do until
    ENDIF
    Read next record from S
END do until
IF non-egual join predicates
        Evaluate non-egual join predicates as selection
            prior to returning records to user and
            removing any records that do not meet the
            selection criteria.
ENDIF

TABLE 2

Distinct Fanout Join

IN, ANY, and EXISTS predicated subqueries can be transformed in to a distinct fanout join. For IN, ANY, and EXISTS subqueries, if the subquery returns a record which satisfies the answer set, the record is returned to the user.
    Assume tables R and S are being joined, where S is the primary dial.
Build the hash table on S
For each R-tuple
    DONE=false
    while not DONE
        probe the hash table on S
        if there is a match then
            Evaluate any non-equal join predicates
            If there is still a match then
                Copy R-tuple to result buffer
                DONE=true
            endif
        else
            DONE=true
        endif
    enddo
endfor

TABLE 3

Unique Fanout Join

Basic predicate subqueries can be transformed in to unique fanout join. For a basic predicate subquery, if the subquery returns more than one record in its answer set, an error is issued, and these semantics must be preserved when transforming the subquery into a join.
    Assume tables R and S are being joined, where S is the primary dial.
The algorithm for hash join is:
Build the hash table on S applying the selection on S
    before building the hash table
For each R-tuple
    DONE=false
    while not DONE do
        probe the hash table on S
        if there is a match then
            evaluate any non-equal join predicates
            If there is a still a match then
                DONE2=false
                while not DONE2 do
                    probe the hash table on S
                    if there is a match then
                        evaluate any non-equal join predicates
                        if there is still a match then
                            Return error and stop
                    endif
                  else
                    DONE2=true
                  endif
                enddo
                if basic-predicate evaluates true then
                    Copy R-tuple to result buffer
                    DONE=true
                endif
            endif
        else
            DONE=true
        endif
    enddo
endfor While the present invention has been described with reference to the details of the embodiments of the invention shown in the drawing, these details are not intended to limit the scope of the invention as claimed in the appended claims.

What is claimed is:

1. A computer program product for processing subquery join composites using hash join in a computer system, said computer program product including a plurality of computer executable instructions stored on a computer readable medium, wherein said instructions, when executed by said computer, cause the computer to perform the steps of:
building a hash table for a first table to be joined with a second table;
building a cursor for the second table;
for each tuple in the second table, probing the hash table for the first table; and
if a match is found, then evaluating any non-equal join predicates.

2. A computer program product for processing subquery join composites using hash join as recited in claim 1 wherein said instructions, when executed by said computer, further cause the computer to perform the steps of processing a unique fanout join.

3. A computer program product for processing subquery join composites using hash join as recited in claim 2 wherein said instructions, when executed by said computer, further cause the computer to perform the steps of returning an error if a tuple or row from the second table joins to more than one row in the first table where the result of the basic predicate subquery can only be one row.

4. A computer program product for processing subquery join composites using hash join as recited in claim 1 wherein said instructions, when executed by said computer, further cause the computer to perform the steps of processing a distinct fanout join.

5. A computer program product for processing subquery join composites using hash join as recited in claim 4 wherein said instructions, when executed by said computer, further cause the computer to perform the steps of when the tuple or row from the second table joins to a row in the first table, returning the row without checking for any more matches on the first table, and advancing to a next tuple in the second table.

6. A computer implemented method for processing subquery join composites using hash join comprising the steps of:

building a hash table for a first table to be joined with a second table;

building a cursor for the second table;

for each tuple in the second table, probing the hash table for the first table; and if a match is found, then evaluating any non-equal join predicates.

7. A computer implemented method for processing subquery join composites using hash join as recited in claim 6 includes the steps of processing a unique fanout join and returning an error if a tuple or row from the second table joins to more than one row in the first table where the result of the basic predicate subquery can only be one row.

8. A computer implemented method for processing subquery join composites using hash join as recited in claim 6 includes the steps of processing a distinct fanout join and when the tuple or row from the second table joins to a row in the first table, returning the row without checking for any more matches on the first table, and advancing to a next tuple in the second table.

9. A computer implemented method for processing subquery join composites using hash join as recited in claim 8 wherein the step of returning the row includes the step of copying the tuple of the second table to a result buffer.

10. A computer system having for processing subquery join composites using hash join comprising:

a processor, a memory coupled to the processor for storing a database;

a query optimizer for implementing the hash join and said query optimizer including;

means for building a hash table for a first table to be joined with a second table;

means for building a cursor for the second table;

for each tuple in the second table, means for probing the hash table for the first table; and means responsive to a match for evaluating any non-equal join predicates.

11. A computer system as recited in claim 10 wherein said query optimizer including means for processing a unique fanout join and for returning an error if a tuple or row from the second table joins to more than one row in the first table where the result of the basic predicate subquery can only be one row.

12. A computer system as recited in claim 10 wherein said query optimizer including means for processing a distinct fanout join and when the tuple or row from the second table joins to a row in the first table, for returning the row without checking for any more matches on the first table, and for advancing to a next tuple in the second table.

* * * * *